March 11, 1924.
A. W. SMITH
SCISSORS AND SHEARS
Filed May 5, 1920
1,486,165
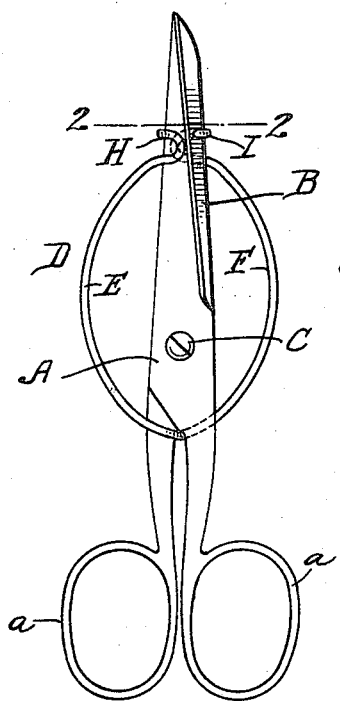
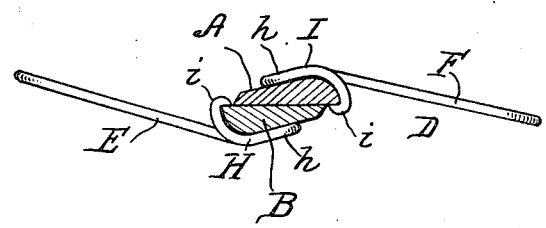
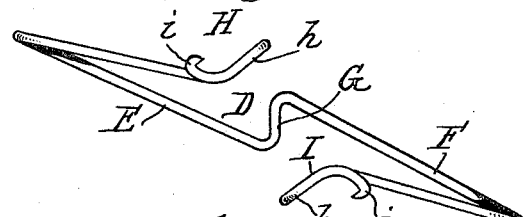
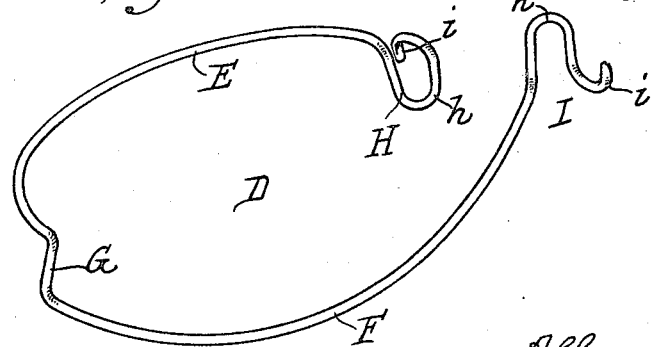
INVENTOR
Allan W. Smith
BY
ATTORNEY Patented Mar. 11, 1924.

1,486,165

UNITED STATES PATENT OFFICE.

ALLAN W. SMITH, OF BROOKLYN, NEW YORK.

SCISSORS AND SHEARS.

Application filed May 5, 1920. Serial No. 379,004.

*To all whom it may concern:*

Be it known that I, ALLAN W. SMITH, a citizen of the United States, residing in the city of New York, borough of Brooklyn, county of Kings, and State of New York, have invented certain new and useful Scissors and Shears, of which the following is a specification.

This invention pertains to scissors and shears, one object being to improve the cutting action by the application of pressure in a manner to normally maintain the cutting edges of the blades in shearing relation.

A further object is to apply pressure to the blades independently of the pivotal connection between said blades, the points of pressure application being remote to and well forward of said pivotal connection.

According to this invention, a double armed spring is employed in connection with a pair of shears or scissors the blades of which are pivoted together by the usual rivet, screw, or any other device commonly resorted to for the purpose. The double armed spring employed by me is of peculiar form in several respects, among which peculiarities are the capacity of the spring for pressing the blades laterally and into contact with each for preserving the cutting edges in the required shearing relation, and, further, the end portions of said spring are fashioned for fixed attachment to the neutral marginal portions of the blades in order that the spring will act to retain itself in operative relation to said blades and without resorting to separate means for securing such fixed attachment.

In a practical form, the spring is composed of a piece of resilient metal bent intermediate its ends to produce two arms and a bridge member joining said arms, said arms being arched or bowed longitudinally and said bridge member extending at an angle to the arms. Each arm is twisted to impart torsion thereto, the two arms having a tendency to spring in opposite directions to each other. At or near the free end of each arm the metal is bent to produce a loop and a hook, the latter terminating in a tapering beak and the whole resulting in the formation of a clip whereby the end portion of the spring is adapted for fixed attachment to one of the two shear blades.

In applying the spring to the ordinary scissors or shears, the blades are opened and the spring slipped into place for the bridge member to extend through the space between the handles and rearwardly of the pivotal connection, the two arms or members of said spring extending near the respective blades and forwardly of the pivot. To attach the spring, the operator should deflect one member until the clip is in position for the beak to snap over the blade at the neutral edge thereof, and then the clip is pressed toward the blade, the pressure applied being sufficient to deflect the clip against its spring action until the beak snaps over the neutral edge of the blade. One member having been engaged with one blade, the operator next proceeds to press the other spring member sidewise until the clip clears the other blade, and thereupon the spring member is pressed until the loop of the clip passes the neutral edge of said blade, after which the clip is pressed into forcible contact with the blade until the beak of the clip snaps over the said neutral edge of the second blade.

The torsion action of the spring tends to apply pressure laterally to the two blades, thus retaining the two blades into normal contact and maintaining the cutting edges in a desired shearing relation. It is to be noted that the spring members are connected to the shear blades forwardly of the pivot and adjacent the free ends of the blades, the same constituting an advantageous organization for the reason that the blades are pressed laterally together so as to improve the cutting action at the point of the shears.

Others functions and advantages of the invention will appear from the following detailed description, taken in connection with the drawings, wherein—

Figure 1 is a plan view of an ordinary shears with my tension spring applied thereto.

Figure 2 is a cross section on the line 2—2 of Figure 1.

Figure 3 is an end view of the spring, and

Figure 4 is a perspective view of the spring detached from the shears.

In Figures 1 and 2 of the drawings, the shears comprise blades A B pivoted together as usual at C, each blade having a finger hold $a$. The shears are made as usual; in fact, one of the merits of my invention is that the spring is associated with any ordinary shears without any change in the construction of said shears, particularly at the pivotal connection C.

D is the spring, the same comprising arms as members E F joined by a bridge G and provided with clips H I, formed in the following manner. A single piece of metal of the required length, diameter and temper is selected according to the size of the shears or scissors upon which the spring is to be used, and this metal is bent intermediate its ends to produce a short straight length constituting the bridge member G, and resulting in the two arms or members E F, each arm being bowed or arched in the direction of its length, see Figures 1 and 4. The torsion of the spring throws the arms or members E F past one another in the manner shown normally in Figure 3, but when the spring is applied to the shear blades as in Figure 2 the relative positions of the spring arms or members, E, F, are changed, and in a measure reversed, thus utilizing the torsion of the spring for pressing the blades A B laterally into contact, see Figure 2.

The clips, H, I, are at the free end portions of the spring members, E, F, respectively, and to produce one of said clips the end portion of the spring metal is formed into a loop *h* and then bent over and tapered into the beak *i*, as shown more particularly in Figures 2, 3 and 4.

To apply the spring, the shears are opened, and the spring is inserted between the handles *a* for the bridge G to occupy the position between the blades rearwardly of the pivot C. The members or arms E F extend adjacent the blades and are curved with respect thereto, said members being deflected with reference to the plane of the blades as depicted in Figure 3. The operator presses the members E F in opposite directions to reverse the relative positions from that shown in Figure 3 to that of Figure 2, and the clips H I are snapped over the blades A B at the neutral edges thereof. It will be noted that each clip is positioned for the loop *h* thereof to have contact with the outer face of one blade, whereas the hook and beak extend around the neutral edge and lap over to a limited extent the inner face of the blade, see Figure 2, it being required in attaching the clip to press the hook and beak over the neutral edge of the blade so as to snap the clip into fixed engagement therewith. The clip retains itself by torsion action in fixed relation to the blade, and the two clips of the spring are thus connected to the respective blades in a manner to frictionally hold the spring in operative position upon the blades without resorting to the use of separate fastening means, and without modifying or changing the shear construction in any particular.

The spring is economically made from appropriate metal, and it is quickly and easily applied to any kind of scissors or shears. The spring is so positioned on the shears that it does not interfere in any way with the use of the shears in cutting fabrics, etc., and said spring cooperates with the blades in a manner to improve to a material extent the cutting action of the shears, particularly at the points of the blades.

Having thus fully described the invention, what I claim as new, and desire to secure by Letters Patent is:

1. A shears spring comprising a plurality of torsion members and a cross member unitary with said torsion members, said torsion members being inclined to the length of said cross member and each torsion member being provided at its free end with a clip positioned in a different plane from the plane of he torsion member and engageable with a rear edge of a shears blade for twisting said torsion member and imparting a desired torque thereto.

2. A shears spring embodying a plurality of curved torsion members and a bridge unitary with said members and connecting the same at one end thereof, each torsion member being bent at the free end into a blade-engaging jaw-formed clip which by the torsion of the member is adapted to extend normally at an angle to the curvature of said member.

3. The combination with shears, of a torsion spring fitted to the shears blades independently of the pivoted connection, said spring embodying torsion members attached to the blades at the rear edges thereof and forwardly of the pivotal connection between said blades.

4. The combination with shears, of a torsion spring fitted to the shears independently of the pivotal connection between the shears blades, said spring comprising torsion members extending forwardly of the blade pivot and clipped to the blades adjacent the points thereof.

5. The combination with shears, of a torsion spring fitted to the shears independently of the pivotal connection between the shears blades, said spring comprising bowed torsion members provided with clips attached to the neutral edges of the shears blades adjacent the points thereof.

6. The combination with shears, of a torsion spring fitted to said shears independently of the pivotal connection between the blades thereof, said spring comprising bowed members the torsion of which deflects said members to occupy different planes, each member being provided with a clip engageable with a neutral marginal portion of a shears blade.

7. As a new article of manufacture, a shears spring comprising torsion members normally deflected relatively to each other to occupy different planes, each member being provided with a loop and a hook constituting a clip adapted to be applied by a torsion action for frictionally holding the spring upon the neutral marginal portion of a shears blade.

8. A shears spring embodying a bridge and a plurality of torsion spring members, each member being provided with an angularly positioned jaw-formed clip engageable with a shears blade at the neutral edge thereof.

9. A shear spring embodying a plurality of torsion spring members each provided at a free end with a clip normally occupying an angular relation to the length of said member and engageable with a shears blade at the neutral edge thereof.

In testimony whereof I have signed my name hereto this 3rd day of May, 1920.

ALLAN W. SMITH.